(12) United States Patent
Pawar et al.

(10) Patent No.: US 10,447,052 B2
(45) Date of Patent: Oct. 15, 2019

(54) APPARATUS, METHOD, AND SYSTEM FOR DYNAMICALLY CONTROLLING CURRENT AND/OR VOLTAGE PROFILES

(71) Applicant: Intel Corporation, Santa Clara, CA (US)

(72) Inventors: Sagar C. Pawar, Bangalore (IN); Anantha Narayanan, Bangalore (IN); Ravindra A. Babu, Bangalore (IN); Aneesh A. Tuljapurkar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 237 days.

(21) Appl. No.: 15/467,874

(22) Filed: Mar. 23, 2017

(65) Prior Publication Data

US 2018/0278075 A1 Sep. 27, 2018

(51) Int. Cl.
*H02J 7/00* (2006.01)
*H02J 7/02* (2016.01)
*G06F 1/26* (2006.01)
*G06F 1/3212* (2019.01)

(52) U.S. Cl.
CPC .......... *H02J 7/0068* (2013.01); *G06F 1/266* (2013.01); *G06F 1/3212* (2013.01); *H02J 7/0047* (2013.01); *H02J 7/0054* (2013.01); *H02J 7/027* (2013.01); *H02J 2007/005* (2013.01); *H02J 2007/0062* (2013.01); *H02J 2007/0096* (2013.01)

(58) Field of Classification Search
CPC ............ H02J 7/0068; H02J 2007/0096; H02J 2007/0062; H02J 7/0054
See application file for complete search history.

(56) References Cited

U.S. PATENT DOCUMENTS

| 2009/0063877 | A1 | 3/2009 | Lewis et al. | |
| 2011/0107124 | A1 | 5/2011 | Tupman et al. | |
| 2014/0091623 | A1* | 4/2014 | Shippy | H02J 7/0019 307/31 |
| 2016/0380455 | A1* | 12/2016 | Greening | H02J 7/0044 320/114 |
| 2016/0380475 | A1 | 12/2016 | Yang | |

OTHER PUBLICATIONS

International search Report and Written Opinion for International Patent Application No. PCT/US18/19516, dated Jun. 4, 2018.

* cited by examiner

*Primary Examiner* — Jared Fureman
*Assistant Examiner* — Duc M Pham
(74) *Attorney, Agent, or Firm* — Green, Howard & Mughal LLP

(57) ABSTRACT

An apparatus system is provided which comprises: a first input/output (I/O) port; a second I/O port; circuitry to generate (i) a first signal at a first voltage level and (ii) a second signal at a second voltage level; and switching circuitry to selectively supply any one of the first signal or the second signal to any one of the first I/O port or the second I/O port.

20 Claims, 8 Drawing Sheets

200

The battery charge of the laptop is likely to be exhausted in about 15 minutes (remaining battery charge level – 15%)

Do you want to (please select one):

○ (i) keep on charging the cell phone attached to the laptop without reducing the charging current, ○ (ii) stop charging the cell phone attached to the laptop (that may prolong the battery charge to about 30 minutes), or ○ (iii) reduce the charging current supplied to the cell phone (that may prolong the battery charge to about 24 minutes)?"

If you do not do anything, option (iii) will be selected by default

Fig. 2

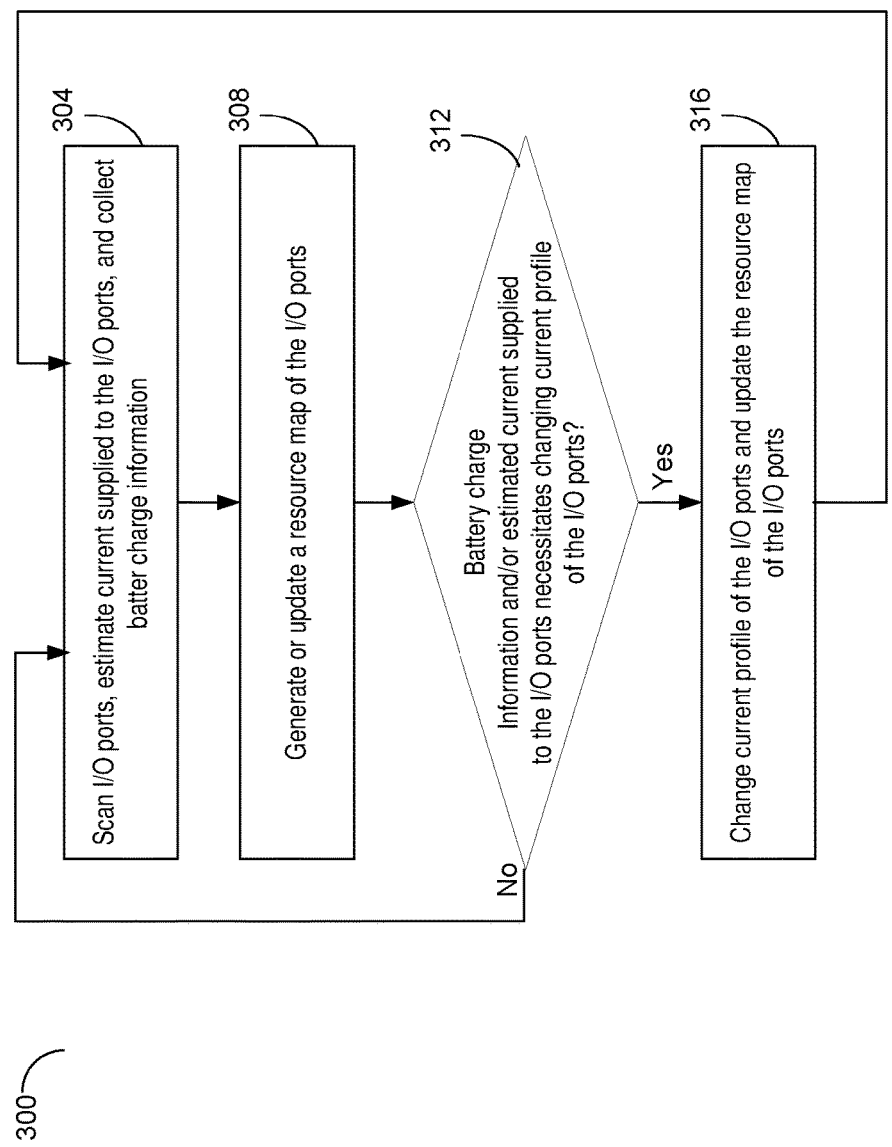

600

"The battery charge of the laptop is likely to be exhausted in about 15 minutes (remaining battery charge level – 15%)

Do you want to (please select one):

○ (i) keep on charging the cell phone attached to the laptop without reducing the power delivered to the cell phone, ○ (ii) stop charging the cell phone attached to the laptop (that may prolong the battery charge to about 40 minutes), or ○ (iii) reduce the power delivered to the cell phone (that may prolong the battery charge to about 30 minutes)?"

If you do not do select, option (iii) will be selected by default

Fig. 6

APPARATUS, METHOD, AND SYSTEM FOR DYNAMICALLY CONTROLLING CURRENT AND/OR VOLTAGE PROFILES

BACKGROUND

A battery-operated consumer electronic device (e.g., a laptop) may supply power to a computing device (e.g., a cell phone) via, for example, a Universal Serial Bus (USB) port. In an example, when the battery power of the laptop is low and the laptop does not receive power from an alternating current (AC) source via a power adapter, supplying power to the cell phone may relatively quickly deplete the remaining battery power of the laptop.

In another example, the cell phone may be configured to receive power at a first voltage level via a USB connection, e.g., to charge the cell phone. However, a specific USB port of laptop may be configured to supply power only at a second voltage level that is different from the first voltage level. In such a scenario, if the cell phone is connected to the laptop via the specific USB port of the laptop, the cell phone may not be charged satisfactorily based on receiving the second voltage level.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 2 illustrates an interface to indicate a warning that may be displayed to limit a current output by an I/O port, according to some embodiments.

FIG. 3 illustrates a flowchart depicting a method for selectively limiting a current supply to one or more I/O ports of a system, based at least in part on battery charge information, according to some embodiments.

FIG. 6 illustrates an interface to indicate a warning that may be displayed to limit a power output by an I/O port, according to some embodiments.

DETAILED DESCRIPTION

Figure 1:
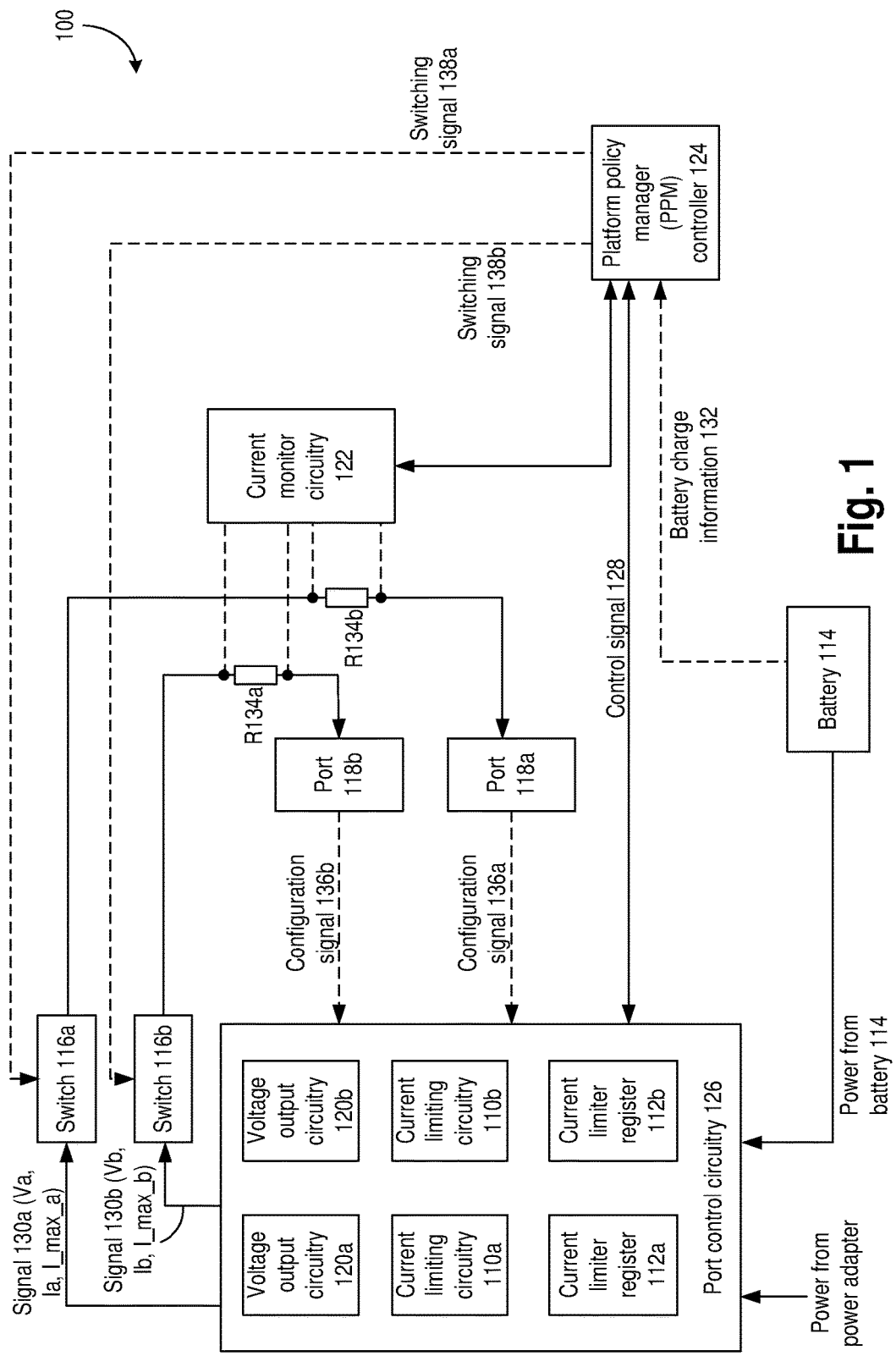
FIG. 1 schematically illustrates a computing system comprising circuitry to limit a current output by an input/output (I/O) port, based at least in part on battery charge information of a battery of the system, according to some embodiments.

A computing system can have a plurality of I/O ports, which may be, for example, USB ports (e.g., type-C USB ports). These ports can supply power to attached external devices. While supplying power to the external devices via these ports may be acceptable when the computing system receives power from an external AC source and/or when a battery of the computing device is fully or near fully charged, such supplying of power may be an issue when the battery charge of the computing device is low (or when the computing system does not receive power from any external AC source).

In some embodiments, a computing system may dynamically change a current profile of an I/O port, e.g., based on a charge level of the battery of the computing system. Merely as an example, when the battery charge level is above a threshold, the computing system can have a higher limit on current transmitted through the I/O port. However, as and when the battery gets depleted, the computing system may impose lower limits on the current transmitted through the I/O port. This, for example, ensures that the external device still receives some power when the battery charge level is low, yet the battery charge level is depleted at a much lower rate.

In some embodiments, in addition to or instead of controlling the current profile, the computing system may also dynamically control a voltage profile of an I/O port. The voltage profile may be controlled based on the charge level of the battery, a voltage requirement of an external device connected to the I/O port, and/or the like. For example, if there are two I/O ports in the computing system, the computing system may generate a first signal at a first voltage level for supplying to a first I/O port, and may generate a second signal at a second voltage level for supplying to a second I/O port. The computing system may also include a switching circuitry to supply the first signal to either of the first or second I/O ports, and to supply the second signal to also either of the first or second I/O ports. For example, any I/O port can receive any of the first and second signals. Thus, an I/O port can receive a signal at either the first voltage level or the second voltage level. This may increase the flexibility of using the I/O port. For example, the I/O port can be used with devices rated for the first voltage level and also with devices rated for the second voltage level. Additionally, when the battery level of the computing system is relatively low, a lower voltage level can be supplied to the I/O ports, e.g., to decrease a rate with which the battery charge is being depleted. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on." The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C). The terms "left," "right," "front," "back," "top," "bottom," "over," "under," and the like in the description and in the claims, if any, are used for descriptive purposes and not necessarily for describing permanent relative positions.

FIG. 1 schematically illustrates a computing system 100 (henceforth referred to as a "system 100") comprising circuitry to limit a current output by an input/output (I/O) port, based at least in part on battery charge information of a battery 114 of the system, according to some embodiments. The system 100 may be any appropriate computing system that operates at least in part on power supplied by the battery 114, e.g., a laptop, a cellular or mobile phone, a smart phone, a tablet, a personal digital assistant (PDA), a pager, a wearable device, an Internet-of-things (TOT) device, a modem, a router, a set-top box, or an appropriate consumer electronic device.

In FIG. 1, some of the signal lines are illustrated using solid lines and some are illustrated using dotted lines merely for the sake of better illustrative clarity and merely to reduce clutter in the figure. Some of the signal lines in FIG. 1 are illustrated to intersect each other, but they may not be electrically coupled at the intersection point, as would be readily understood by those skilled in the art. When two signal lines intersect and are electrically coupled at the intersecting point, such an intersecting point is illustrated using a small dot, as would be readily understood by those skilled in the art.

Although not illustrated in FIG. 1, the system 100 comprises a power adapter to receive an alternating current (AC) power, and to supply direct current (DC) power to charge the battery 114 and/or to operate the system 100. The battery 114, for example, supplies power to the system 100 when the power from the power adapter is absent and/or is inadequate.

In some embodiments, the system 100 further comprises an I/O port (henceforth also referred to as a "port") 118a and a port 118b. Although two ports 118a and 118b are illustrated in FIG. 1, in some other embodiments, the system 100 may comprise a single port, three ports, four ports, or a higher number of ports. In some examples, one or both the ports 118a and 118b are USB ports, e.g., USB type-C (or USB-C) ports. In some other examples, one or both the ports 118a and 118b are Thunderbolt ports. In yet other example, one or both the ports 118a and 118b can operate both as a USB type-C port and a Thunderbolt port. In yet some other examples, one or both the ports 118a and 118b can be any other appropriate type of I/O ports using which external peripheral devices may be attached to the system 100.

In some embodiments, external devices (e.g., which are external to the system 100, not illustrated in FIG. 1) can be connected to the system 100 via the ports 118a and/or 118b. For example, an external device connected to the port 118a can communicate with the system 100 via the port 118a, and/or can receive power (e.g., to charge the external device) via the port 118a.

In some embodiments, the system 100 comprises a port control circuitry 126 (henceforth referred to as "circuitry 126"). The circuitry 126 supplies signals 130a and 130b to the ports 118a and 118b, respectively, via switches 116a and 116b, respectively. In an example, the signals 130a and 130b are used by the system 100 to communicate with external devices connected to the ports 118a and 118b, respectively. In another example, the signals 130a and 130b are used by the system 100 to supply power to the external devices connected to the ports 118a and 118b, respectively (e.g., to charge the external devices).

In some embodiments, the signals 130a and 130b have voltages Va and Vb, respectively. The voltages Va and Vb can have any appropriate values, which may be based on a configuration of the circuitry 126, the types of the ports 118a, 118b, types of external devices connected to the ports 118a and 118b, etc. Merely as an example, if the port 118a is a USB type-C port, the voltage Va can be one of 5 volts (V), 9V, 12V, and 20V. In some embodiments, the circuitry 126 controls the signals 130a and 130b such that the signals 130a and 130b can have maximum current values I_max_a and I_max_b, respectively, as discussed herein.

In some embodiments, the circuitry 126 comprises voltage output circuitries 120a and 120b for respectively outputting the signals 130a and 130b with voltage levels Va and Vb, respectively. The voltage output circuitries 120a and 120b can be of any appropriate type (e.g., may comprise voltage regulators). In some embodiments, the circuitry 126 further comprises current limiting circuitries 110a and 110b for respectively controlling the maximum current values I_max_a and I_max_b of the signals 130a and 130b, respectively. The circuitry 110a and/or the circuitry 110b, for example, comprises operational amplifiers and/or other circuit elements that may limit the maximum currents of the signals 130a and 130b to the maximum current values I_max_a and I_max_b, respectively.

In some embodiments, the circuitry 126 further comprises current limiter registers 112a and 112b (henceforth referred to as registers 112a and 112b, respectively). In an example, a value written in the register 112a controls the maximum current value I_max_a. Merely as an example, assuming that the register 112a is a two-bit register, if 00 is written to the register 112a, the maximum current value I_max_a imposed by the current limiting circuitry 110a may be 300 milli-Amperes (mA); if 01 is written to the register 112a, the maximum current value I_max_a imposed by the current limiting circuitry 110a may be 1 Ampere (A); if 10 is written to the register 112a, the maximum current value I_max_a imposed by the current limiting circuitry 110a may be 1.5 A; and if 11 is written to the register 112a, the maximum current value I_max_a imposed by the current limiting circuitry 110a may be 3 A. The register 112b may also similarly control the maximum current value I_max_b.

In some embodiments, the circuitry 126 generates the signals 130a and 130b based on receiving power from the power adapter (not illustrated in FIG. 1) and/or power from the battery 114. For example, when the power adapter is coupled to the AC supply, the circuitry 126 may receive power from the power adapter (and optionally from the battery 114 as well). When the power adapter is not coupled to the AC supply, the circuitry 126 may receive power from the battery 114.

In some embodiments, a current monitor circuitry 122 (henceforth also referred to as "circuitry 122") estimates currents Ia and Ib of the signals 130a and 130b, respectively. The circuitry 122 may estimate the currents Ia and Ib of the signals 130a and 130b using any appropriate method. Merely as an example, resistors R134a and R134b may be connected in the signal lines 130a and 130b, respectively. The circuitry 122 may measure the voltage drops across the resistors R134a and R134b to respectively estimate the currents Ia and Ib of the signals 130a and 130b, as illustrated in FIG. 1.

In some embodiments, the port 118a may transmit a configuration signal 136a to the circuitry 126 when, for example, an external device is attached or coupled to the port 118a. The configuration signal 136a may indicate a type of the external device, a configuration of the external device, a voltage requirement of the external device, and/or the like. Merely as an example, if a first external device is coupled to the port 118a during a first time-period and if the first external device is rated or configured to receive 5V from the port 118a, then the configuration signal 136a may indicate that information—accordingly, the circuitry 120a may output the signal 130a with the voltage Va being 5V. In some embodiments, the configuration signal 136a may also indicate a current requirement of the first external device. Merely as an example, the first external device may have a maximum current requirement of 1 A, and the configuration signal 136a may indicate such a maximum current requirement to the circuitry 126. In some embodiments, the configuration signal 136b may also indicate to the circuitry 126 similar information about external devices being coupled to the port 118b.

In some embodiments, the system 100 comprises a platform policy manager (PPM) controller 124. In some embodiments, the controller 124 may be implemented using hardware, software, or a combination of hardware and software. In some embodiments, the controller 124 may be implemented using appropriate logic and/or circuitry. In some embodiments, the controller 124 may control various aspects of an operation of the system 100.

In some embodiments, the controller 124 may generate switching signals 138a and 138b for respectively controlling the switches 116a and 116b. In an example, the switch 116a may be any appropriate type of transistor that may be controlled by the switching signal 138a (e.g., which can either turn on or turn off the transistor). Similarly, in an example, the switch 116b may be any appropriate type of transistor that may be controlled by the switching signal 138b (e.g., which can either turn on or turn off the transistor).

In some embodiments, the controller 124 may receive a current battery charge level from the battery 114. For example, the controller 124 receives an indication as to whether the battery 114 is about 100% charged, about 50% charged, etc. In some embodiments, the controller 124 may also receive other appropriate information about the battery 114, e.g., an indication of whether the battery 114 is current being charged using power from an external AC source, a rate with which the battery 114 is being charged, a rate with which the charge of the battery is being depleted, an estimated amount of time the charge of the battery 114 is likely to last, etc. All such information received by the PM 124 from the battery is collectively referred to as battery charge information 132 in FIG. 1. Although FIG. 1 illustrates the controller 124 receiving the battery charge information 132 from the battery 114, in some examples, the controller 124 may receive the battery charge information 132 from another appropriate component connected to the battery 114 (e.g., a battery control circuitry, a battery fuel gauge, a battery charge gauge, and/or the like, not illustrated in FIG. 1).

In some embodiments, based at least in part on the battery charge information 132, the controller 124 generates a control signal 128 to control the circuitry 126. For example, the controller 124 may control the contents of the registers 112a and/or 112b of the circuitry 126, e.g., via the control signal 128. Also, as discussed, in an example, the registers 112a and 112b control the maximum current values I_max_a and I_max_b imposed by the circuitry 110a and 110b, respectively, on the signals 130a and 130b (although in another example, the registers 112a and 112b may control the actual currents Ia and Ib of the signals 130a and 130b). Thus, in some embodiments, the controller 124 may control the maximum current values I_max_a and I_max_b of the signals 130a and 130b, respectively, e.g., via the control signal 128. Although FIG. 1 illustrates a single signal line corresponding to the control signal 128, in some embodiments, the control signal 128 may comprises at least two separate control signals for respectively controlling the registers 112a and 112b.

Merely as an example, when the battery 114 is fully charged (or charged above a high threshold limit) and/or when the power adapter receives AC power, the controller 124 may not desire to control the current profile of the signals 130a and 130b. In such a situation, the current profile of the signals 130a and 130b (e.g., the maximum current values I_max_a and I_max_b of the signals 130a and 130b) may be determined by various other factors, e.g., based on configuration or rating of the external devices connected to the ports 118a and 118b (e.g., as indicated by the configuration signals 136a and 136b), based on the configuration of the circuitry 126, etc. However, when the battery 114 is not fully charged (or charged below the high threshold limit) and/or when the power adapter does not receive any AC power, the controller 124 may start controlling the current profile of the signals 130a and/or 130b, e.g., by imposing limits on the maximum current values I_max_a and/or I_max_b.

For example, a configuration or rating of an external device (which may be a cellular phone, for example) connected to the port 118a may dictate that the maximum current value I_max_a be 3 A, e.g., which may be used to charge the cellular phone. As long as the battery 114 is fully charged (or charged above the high threshold limit) and/or when the power adapter receives AC power, the circuitry 126 may set the maximum current value I_max_a to be 3 A, e.g., without any intervention from the controller 124. However, if the power adapter does not receive the AC power and/or if, for example, the charge level of the battery 114 is below the high threshold level, the controller 124 may decrease the maximum current value I_max_a. For example, the controller 124 may write an appropriate value in the register 112a using the control signal 128, which may result in the circuitry 110a decreasing the maximum current value I_max_a.

In an example, the decrease in the maximum current value I_max_a can be done in increments. For example, when the battery 114 is charged above a high threshold limit of 50% and/or when the power adapter receives AC power, the default maximum current value I_max_a may be 3 A. Also, merely as an example, if the charge of the battery 114 is between 50% and 30%, the maximum current value I_max_a may be decreased to 1 A. If the charge of the battery 114 becomes less than 30%, the maximum current value I_max_a may be further decreased to 300 mA, using which the cellular phone connected to the port 118a may be trickle-charged. If the charge of the battery 114 becomes less than 15%, the maximum current value I_max_a may be further decreased to zero amperes, e.g., which may be achieved by simply switching off the switch 116a. In an example, if the system 100 starts receiving AC power via the power adapter, the controller 124 may relinquish controlling the maximum current value I_max_a, or may increase the maximum current value I_max_a (e.g., the maximum current value I_max_a may become 3 A) as and when the charge level of the battery 114 increases above 50%. In some embodiments, the controller 124 may also control the maximum current value I_max_b in a similar manner.

In some embodiments, when the charge of the battery 114 is below a threshold level (e.g., 15%), the controller 124 may switch off the switch 116a and/or 116b, thereby disconnecting the ports 118a and/or 118b, respectively, from the circuitry 126. Such disconnection, for example, may prevent any leakage of current from the circuitry 126 to any external devices potentially attached to the ports 118a and/or 118b. In an example, such switching off the switch 116a and/or 116b may be akin to limiting the maximum current values I_max_a and I_max_b to zero. For example, if a first external device and a second external device are respectively connected to the ports 118a and 118b and if the battery charge level is below a threshold (e.g., such that the system 100 may not be able to support the two external devices), controller 124 may switch off the switch 116a and/or 116b, e.g., to disconnect one or both the first and second external devices from the circuitry 126.

In some embodiments, setting the maximum current value I_max_a may not necessarily mean that the port 118a is actually consuming the maximum allowed current. Merely as an example, based on a configuration of an external device connected to the port 118a, the maximum current value I_max_a may be set to 3 A. However, the external device may consume relatively less current, e.g., 1 A. Merely as an example, the external device may be a cellular phone being charged through the port 118a. Although the cellular phone may be rated or configured to receive a maximum of 3 A via the port 118a, during later stages of charging the cellular phone (e.g., when a battery of the cellular phone is almost charged), the cellular phone may only consume 1 A. Assume that the controller 124 decides that, based on a charge level of the battery 114, the system can supply up to 1.5 A to the port 118a. Also, the circuitry 122 may estimate the current supplied via the port 118a, and transmit the estimate to the controller 124. The controller 124, thus, may be aware that the circuitry 126 is supplying merely 1 A via the port 118a, although the maximum current value I_max_a may be set to 3 A. In such a situation, the controller 124 may not limit the maximum current value I_max_a to 3 A. But, for any reason (e.g., due to the cellular phone starting to consume more power via the port 118a, or a different external device being attached to the port 118a) if the port 118a starts supplying more than 1.5 A to the connected external device, the controller 124 may start controlling the maximum current value I_max_a, e.g., by setting to 1.5 A. In some embodiments, the controller 124 may also control the maximum current value I_max_b in a similar manner.

In some embodiments, instead of, or in addition to, the controller 124 controlling the maximum current values I_max_a and I_max_b, the controller 124 may seek user input to limit the maximum current values I_max_a and I_max_b. For example, the controller 124 (or another appropriate element of the system 100) may display a warning on a display screen (not illustrated in FIG. 1) of the system 100 that the battery power of the system 100 is likely to be exhausted in, for example, 15 minutes (or may display the charge level of the battery). In some embodiments, the controller 124 may seek user input as to whether to limit the maximum current values I_max_a and I_max_b.

Merely as an example, as illustrated in FIG. 2, the display screen may display a warning 200 as follows: "The battery charge of the laptop is likely to be exhausted in about 15 minutes (remaining battery charge level—15%). Do you want to (i) keep on charging the cell phone attached to the laptop without reducing the charging current, (ii) stop charging the cell phone attached to the laptop (that may prolong the battery charge to about 30 minutes), or (iii) reduce the charging current supplied to the cell phone (that may prolong the battery charge to about 24 minutes)?" In this example, the laptop represents the system 100, and the cell phone represents an external device connected to, for example, the port 118a. Based on a user selecting one of the three options, the controller 124 may (i) continue supplying the signal 130a without limiting the maximum current value I_max_a, (ii) limit the maximum current value I_max_a to zero and/or open the switch 116a, or (iii) limit the maximum current value I_max_a to a lower value. In some embodiments, the warning may also display a default action, e.g., the option (iii). For example, the warning may display also display the following: "If you do not do anything, option (iii) will be selected by default". It is to be noted that the language and nature of the warning 200 is merely an example, and any other appropriate type of warning message may be displayed (e.g., to warn the user and/or to seek appropriate user input).

In some embodiments, the user may configure the system 100, e.g., by setting a default option, e.g., by setting option (iii) of the warning 200 as default. In such an example, the controller 124 may not display the warning 200 (or display another type of warning) and/or may not seek user input when the battery charge level is lower than a threshold level—instead, the controller 124 may take selected action (e.g., limit the maximum current values I_max_a and I_max_b) by default.

Although some of the examples above discuss limiting the maximum current values I_max_a and I_max_b by the controller 124, in some other examples, the controller 124 may limit the actual currents Ia and/or Ib of the signals 130a and/or 130b, e.g., based on the battery charge information 132. In such examples, the circuitry 122 may monitor and estimate the current Ia. The controller 124 may receive the estimate and may also receive the battery charge information 132, based on which the controller 124 may control the currents Ia (and may also similarly control the current Ib).

FIG. 3 illustrates a flowchart depicting a method 300 for selectively limiting a current supply to one or more I/O ports (e.g., ports 118a, 118b) of a system (e.g., the system 100 of FIG. 1) based at least in part on battery charge information (e.g., battery charge information 132), according to some embodiments. At 304, various I/O ports may be scanned and the current supplied to the I/O ports may be monitored. In an example, the circuitry 126 may scan the I/O ports 118a and 118b by, for example, monitoring the configuration signals 136a and 136b. In an example, the circuitry 122 may monitor the current supplied to the I/O ports by, for example, estimating the current supplied to the I/O ports. Also at 304, battery charge information may be collected, e.g., by the controller 124.

At 308, a resource map of the I/O ports may be generated or updated. The resource map of an I/O port may, for example, track the current supplied to the I/O port, track a maximum permissible current value of the current supplied to the I/O port (e.g., maximum current value I_max_a), voltage level of the signal supplied to the I/O port, etc.

At 312, a decision is made as to whether to change a current profile of the I/O ports. In some embodiments, such a decision may be based on the battery charge information, estimated current supplied to the I/O ports, etc. For example, based on the battery charge information and the estimated current supplied to the I/O ports, the controller 124 may estimate current battery charge level, time remaining before the battery charge is likely to be exhausted, a power requirement of the system 100, power requirement of one or more external devices attached to the I/O ports, etc. Based on such information, the controller 124 may decide to change the current profile of one or more I/O ports. The current profile of an I/O port may include, for example, a current supplied to the I/O port, a maximum permissible amount of current that can be supplied to the I/O port, controlling the switches 116a and/or 116b, etc.

If "Yes" at 312, then at 316, the current profile of one or more I/O ports are changed, and the resource map of the I/O ports are updated accordingly. Changing the current profile of an I/O port (e.g., port 118a) may, for example, involve increasing or decreasing a current (e.g., current Ia) supplied to the I/O port, increasing or decreasing a maximum permissible amount of current (e.g., maximum current value I_max_a) that can be supplied to the I/O port, switching on or off the switch 116a, etc. Subsequently, the method 300 loops back to the block 304. Also, if "No" at 312, then the method 300 loops back to the block 304 from block 312, e.g., without altering the current profiles.

Although the blocks in the flowchart with reference to FIG. 3 are shown in a particular order, the order of the actions can be modified. Thus, the illustrated embodiments can be performed in a different order, and some actions/blocks may be performed in parallel. Some of the blocks and/or operations listed in FIG. 3 are optional in accordance with certain embodiments. The numbering of the blocks presented is for the sake of clarity and is not intended to prescribe an order of operations in which the various blocks must occur.

Figure 4:
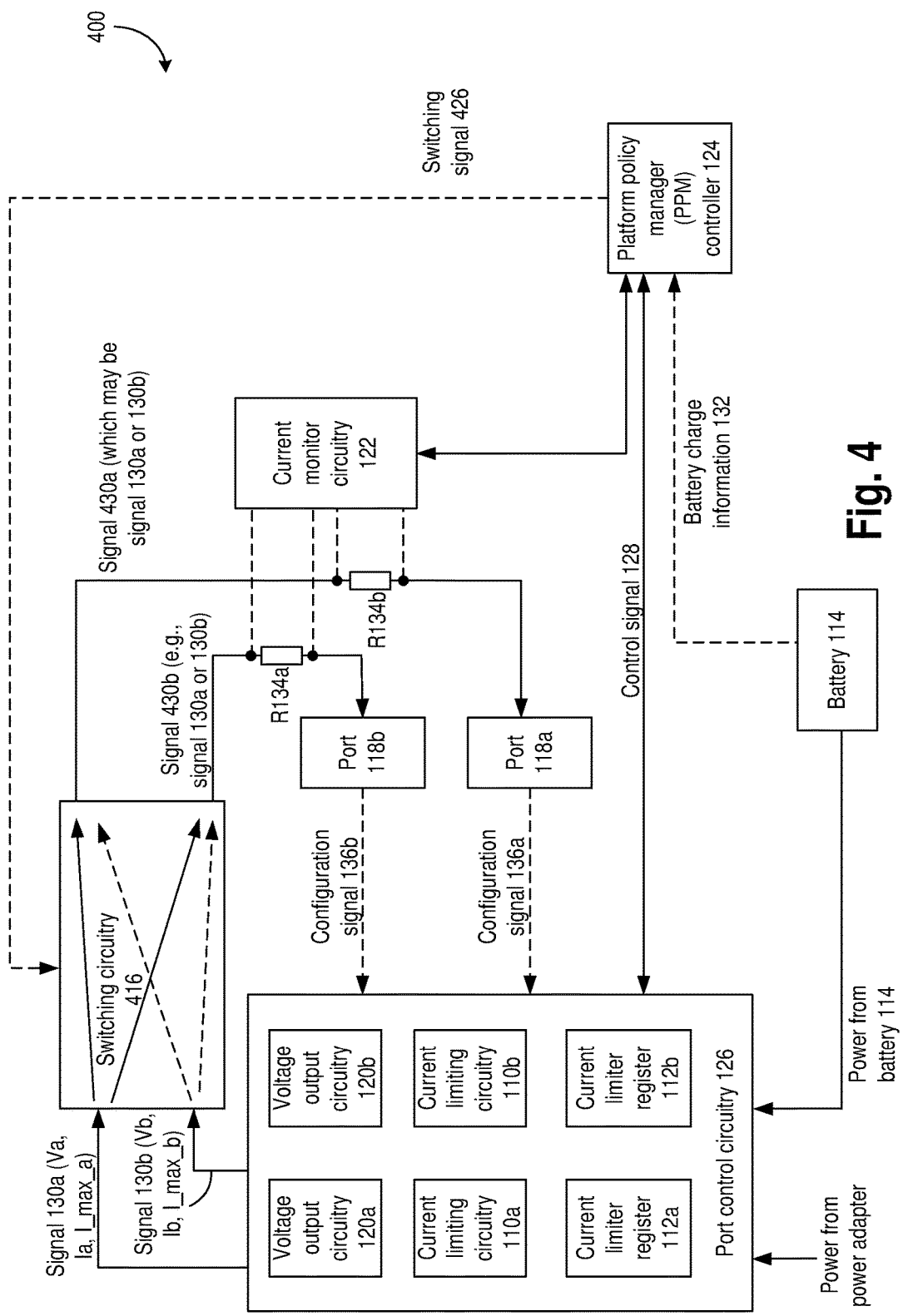
FIG. 4 schematically illustrates a computing system comprising circuitry to dynamically change a voltage profile and/or a current profile of an I/O port, according to some embodiments.

FIG. 4 schematically illustrates a computing system 400 (henceforth referred to as a "system 400") comprising circuitry to dynamically change a voltage profile and/or a current profile of an I/O port, according to some embodiments. The system 400 may be any appropriate computing system that operates at least in part on power supplied by the battery 114, e.g., a laptop, a cellular or mobile phone, a smart phone, a tablet, a personal digital assistant (PDA), a pager, a wearable device, an Internet-of-things (TOT) device, a modem, a router, a set-top box, or another appropriate consumer electronic device.

The system 400 may be at least in part similar to the system 100 of FIG. 1. Similar components on these two systems are labeled using similar labels. For example, similar to the system 100, the system 400 may comprise ports 118a and 118b, circuitry 126 (e.g., which may comprise circuitries 120a, 120b, 110a, 110b, 112a, 112b), the battery 114, resistors R134a, 134a, the current monitor circuitry 122, and the controller 124.

In some embodiments, the system 400 may not have the switches 116a and 166b of the system 100. Instead, in some embodiments, the system 400 may comprise a switching circuitry 416 (henceforth referred to as "circuitry 416"). In an example, the circuitry 416 may receive the signals 130a and 130b output by the circuitry 126, and output signals 430a and 430b to the ports 118a and 118b, respectively.

In some embodiments, the circuitry 416 may be configured by switching signals 426 from the controller 124. Although not illustrated in FIG. 4, the switching signals 426 may be a combination of a plurality of switching signals, as discussed in detail herein later. In some embodiments and as illustrated in a subsequent figure, the circuitry 416 may comprise a plurality of switches.

In some embodiments, the circuitry 416 may control the port 118a by performing one of (i) disconnecting the port 118a from the circuitry 126 (e.g., by switching off one or more switches within the circuitry 416), (ii) connecting the signal 430a to the signal 130a (e.g., such that the signal 130a is supplied to the port 118a), or (iii) connecting the signal 430a to the signal 130b (e.g., such that the signal 130b is supplied to the port 118a). In some embodiments, the circuitry 416 may control the port 118b by performing one of (i) disconnecting the port 118b from the circuitry 126 (e.g., by switching off one or more switches within the circuitry 416), (ii) connecting the signal 430b to the signal 130a (e.g., such that the signal 130a is supplied to the port 118b), or (iii) connecting the signal 430b to the signal 130b (e.g., such that the signal 130b is supplied to the port 118b). Thus, the circuitry 416 may control whether the signal 130a or the signal 130b from the circuitry 126 is received by the port 118a (or whether no signal from the circuitry 126 is received by the port 118a), and may similarly control the port 118b.

Figure 5:
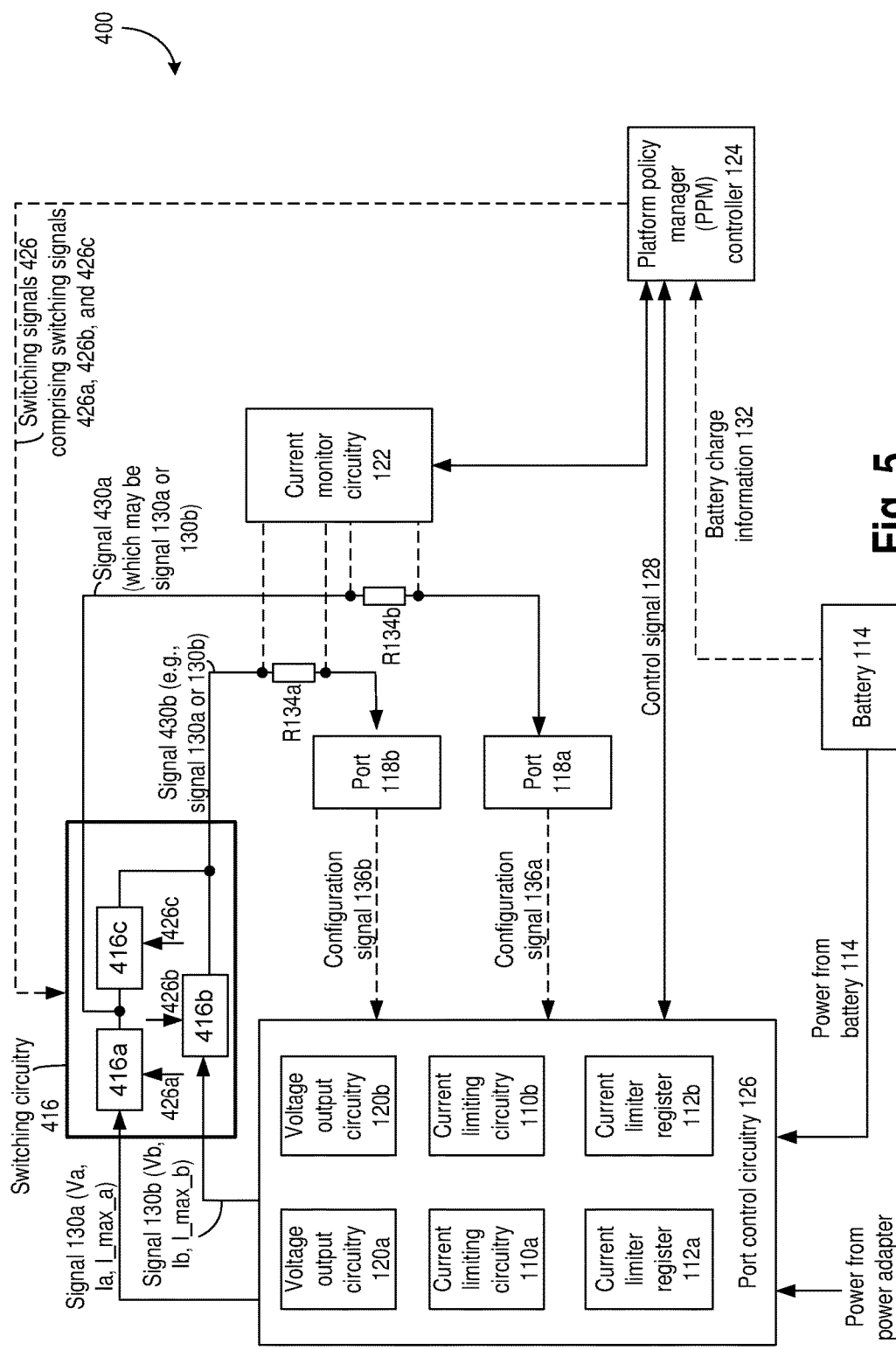
FIG. 5 schematically illustrates an example implementation of a switching circuitry of the computing system of FIG. 4, according to some embodiments.

FIG. 5 schematically illustrates an example implementation of the switching circuitry 416 of the system 400 of FIG. 4, according to some embodiments. In the example implementation of FIG. 5, the circuitry 416 may comprise switches 416a, 416b, and 416c. The switches 416a, 416b, and 416c can be implemented using any appropriate components, e.g., any appropriate type of transistors. In some embodiments, the switching signals 426 may comprise three separate switching signals 426a, 426b, and 426c, which may be supplied from the controller 124 to control the switches 416a, 416b, and 416c, respectively.

In some embodiments, the switches 416a and 416c may be connected in series between the signals 130a and 430b. Also, the switch 416b may be connected between the signals 130b and 430b. In some embodiments, the signal 430a may be generated from a connection between the switches 416a and 416c.

There may be different example scenarios for operating the circuitry 416, as follows:

Scenario 1: switches 416a and 416b are on, and 416c is off. In scenario 1, the port 118a receives the signal 130a, and the port 118b receives the signal 130b. That is, in scenario 1, the ports 118a and 118b receive voltages Va and Vb, respectively, and the currents Ia and Ib, respectively.

Scenario 2: switches 416a and 416c are on, and switch 416b is off. In scenario 2, the port 118a receives the signal 130a with voltage Va and current Ia, and the port 118a also receives the signal 130a with voltage Va and current Ia.

Scenario 3: switches 416b and 416c are on, and switch 416a is off. In scenario 3, the port 118a receives the signal 130b with voltage Vb and current Ib, and the port 118b also receives the signal 130b with voltage Vb and current Ib.

Scenario 4: all switches 416a, 416b, and 416c are off. In scenario 4, the ports 118a and 118b are disconnected from the circuitry 126, and does not receive either of signal 130a or 130b.

Scenario 5: switch 416b is on, and switches 416a and 416c are off. In scenario 5, the port 118a is disconnected from the circuitry 126 and does not receive either of signal 130a or 130b; and the port 118b receives the signal 130b with voltage Vb and current Ib.

Scenario 6: switch 416a is on, and switches 416b and 416c are off. In scenario 5, the port 118b is disconnected from the circuitry 126 and does not receive either of signal 130a or 130b; and the port 118a receives the signal 130a with voltage Va and current Ia.

It should be appreciated that while FIG. 5 illustrates an example implementation of the circuitry 416, the circuitry 416 can be implemented in any other appropriate manner, as would be readily understood by those skilled in the art based on the teachings of this disclosure. Furthermore, additional switches may be added to the circuitry 126 to introduce even more flexibility and options (e.g., additional switches may be introduced to introduce an option of the port 118a receiving the signal 130b, and the port 118b receiving the signal 130a).

Referring again to FIG. 4, the controller 124 may appropriately control the circuitry 416 so that it may be possible to supply any of the two voltages Va and Vb to any of the ports 118a and 118b. Also, as discussed with respect to FIGS. 1-3, the system 400 may also control the currents Ia and/or Ib (or at least the maximum possible values of these currents). Thus, the system 400 of FIG. 4 may control the power supplied to the ports 118a and 118b, e.g., by appropriately controlling a voltage profile and a current profile of a port.

Merely as an example, the port 118a may originally be rated for supplying a higher voltage level (e.g., 9 V). For example, the voltage Va of the signal 130a (that may be originally designated for the port 118a) may be 9 V. For example, the circuitry 120a may be designed to supply the signal 130a to the port 118a at 9 V. On the other hand, the port 118b may originally be rated for supplying a lower voltage level (e.g., 5 V). For example, the voltage Vb of the signal 130b (that may be originally designated for the port 118b) may be 5 V. For example, the circuitry 120b may be designed to supply the signal 130b to the port 118b at 5 V. In a conventional system that does not have the circuitry 416, the ports 118a and 118b may be hardwired to specifically receive 9 V and 5 V, respectively, with no flexibility on which port receives which voltage level. However, introducing the circuitry 416 in the system 400 results in a flexibility on the voltage levels received by the ports 118a and 118b. For example, if a first external device, e.g., which is rated for 9 V, is connected to the port 118b, the circuitry 126 may be aware that the first external device attached to the port 118b is rated for 9 V. Accordingly, the circuitry 126 may request the controller 124 to generate the switching signals 426 such that the port 118b receives the signal 120a with a voltage level of 9 V. Similarly, in another example, if a second external device, e.g., which is rated for 5 V, is connected to the port 118b, the circuitry 126 may be aware that the second external device attached to the port 118b is rated for 5 V. Accordingly, the circuitry 126 may request the controller 124 to generate the switching signals 426 such that the port 118b receives the signal 120b with the voltage level of 5 V. Thus, in some embodiments, the configuration of the switches (e.g., whether individual switches of FIG. 5 are turned on or off) within the circuitry 416 may be based on a rating and/or configuration of the external devices connected to the ports 118a and 118b.

Thus, the circuitry 416 facilitates connecting external devices with ratings of 5 V and 9 V to any of the ports 118a and 118b. In contrast, in a conventional system that does not have the circuitry 416, the ports 118a and 118b may be hardwired to specifically receive 9 V and 5 V, respectively, and the external devices have to be attached to the correct ports only for intended operation.

Additionally, the configuration of the circuitry 416 may also be based on the battery charge information 132. For example, assume that an external device can operate both at 9 V and 5 V. Merely as an example, when a cell phone is being charged via a port 118a, the cell phone may charge relatively faster with a 9 V supply, and may charge slower with a 5 V supply. In such cases, the controller 124 can dynamically control a voltage of the port 118a, e.g., based on the battery charge information 132. For example, when the battery 114 is charged above a threshold and/or when the system 400 receives AC power via the power adapter, the controller 124 may configure the circuitry 416 such that the port 118a receives 9 V (e.g., receives the 9 V signal 130a). However, when the battery charge is below the threshold and/or when the system 400 is not receiving the AC power via the power adapter, the controller 124 may configure the circuitry 416 such that the port 118a now receives 5 V (e.g., receives the 5 V signal 130b). Also, while the port 118a is being supplied 5 V, if the power adapter of the system 100 starts receiving AC power, the controller 124 may re-configure the circuitry 416 such that the port 118a again receives 9 V (e.g., receives the 9 V signal 130a). In an example, when the battery charge is below a low threshold and/or when the system 400 is not receiving the AC power via the power adapter, the controller 124 may configure the circuitry 416 such that the port 118a is disconnected from the circuitry 126 (e.g., does not receive either of the signals 130a or 130b).

Although the above examples discuss configuring the circuitry 416 based on a charge level of the battery and/or whether AC power is being received by the system, the configuration can also be based on other parameters as well, e.g., an estimated time the charge of the battery 114 is likely to last, current consumption of the ports 118a and/or 118b, etc.

In some embodiments, the system 400 may seek an input from a user before limiting the power delivered to a port based on the battery charge information 132. Merely as an example, as illustrated in FIG. 6, the display screen may display a warning 600. The warning 600 may be to an extent similar to the warning 200 of FIG. 2. However, the warning 200 was about possibly reducing current, and the warning 600 may be about possibly reducing power (e.g., by reducing one or both the current and the voltage to a port), and the warning 600 may reflect that, as illustrated in FIG. 6. However, in another example, an average user may not be able to differentiate between current and power, and hence, in some examples, the warnings 200 and 600 may be similar.

Figure 7:
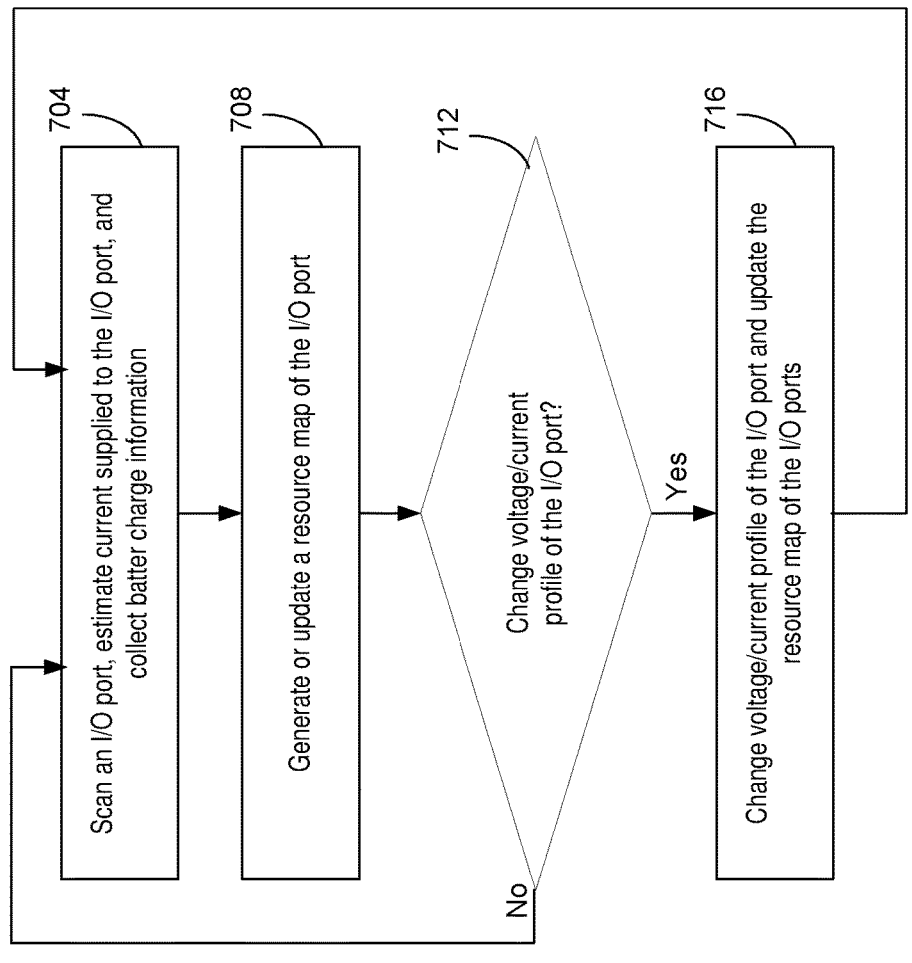
FIG. 7 illustrates a flowchart depicting a method for selectively controlling a voltage profile and/or a current profile of an I/O port, according to some embodiments.

FIG. 7 illustrates a flowchart depicting a method 700 for selectively controlling a voltage profile and/or a current profile of an I/O port (e.g., the port 118a) of a system (e.g., the system 400 of FIGS. 4-5), according to some embodiments. At 704, the I/O port may be scanned, current supplied to the I/O port may be monitored, and/or battery charge information may be collected. In an example, the circuitry 126 may scan the I/O port 118a by, for example, monitoring the configuration signal 136a and 136b. In an example, the circuitry 126 may determine one or more voltage levels that are acceptable to an external device connected to the I/O port, a desired voltage level for the external device, etc., based on scanning the I/O port. In an example, the circuitry 122 may monitor the current supplied to the I/O port by, for example, estimating the current supplied to the I/O port (e.g., by measuring a voltage drop across the resistor R134a). In some embodiments, the battery charge information 132 may be collected, e.g., by the controller 124.

At 708, a resource map of the I/O port may be generated or updated. The resource map of the I/O port may, for example, track the current supplied to the I/O port, power requirement (e.g., voltage and current requirements) of the I/O port, a maximum current value of the current supplied to the I/O port (e.g., maximum current value I_max_a), etc.

At 712, a decision is made as to whether to change a voltage profile and/or a current profile of the I/O port. In some embodiments, such a decision may be based on a variety of factor, e.g., configuration information of the external device attached to the port (e.g., voltage, current and/or power requirement of the external device), the battery charge information, estimated current supplied to the I/O port, etc. For example, if the external device requires a voltage Va, then the circuitry 416 may be configured to supply the signal 130a to the I/O port. On the other hand, if the external device requires a voltage Vb, then the circuitry 416 may be configured to supply the signal 130b to the I/O port. In another example, if the charge level of the battery is lower than a threshold and/or if AC power is not supplied to the system 400, then a lower of the voltages Va and Vb may be supplied to the I/O port. In yet another example, a current profile may have to be changed for the I/O port, e.g., as discussed with respect to FIGS. 1-4.

If "Yes" at 712, then the voltage profile and/or the current profile may be changed, and the resource map may be updated accordingly at 716. For example, the voltage profile may be changed by appropriately controlling the circuitry 416 via the switching signals 426. In another example, the current profile may be changed via the control signal 128 to the circuitry 126. Subsequently, the method 700 may loop back to the block 704. Also, if "No" at 712, then the method 700 may loop back to the block 704 from block 712, e.g., without altering the voltage profile or current profile.

Although the blocks in the flowchart with reference to FIG. 7 are shown in a particular order, the order of the actions can be modified. Thus, the illustrated embodiments can be performed in a different order, and some actions/blocks may be performed in parallel. Some of the blocks and/or operations listed in FIG. 7 are optional in accordance with certain embodiments. The numbering of the blocks presented is for the sake of clarity and is not intended to prescribe an order of operations in which the various blocks must occur.

Figure 8:
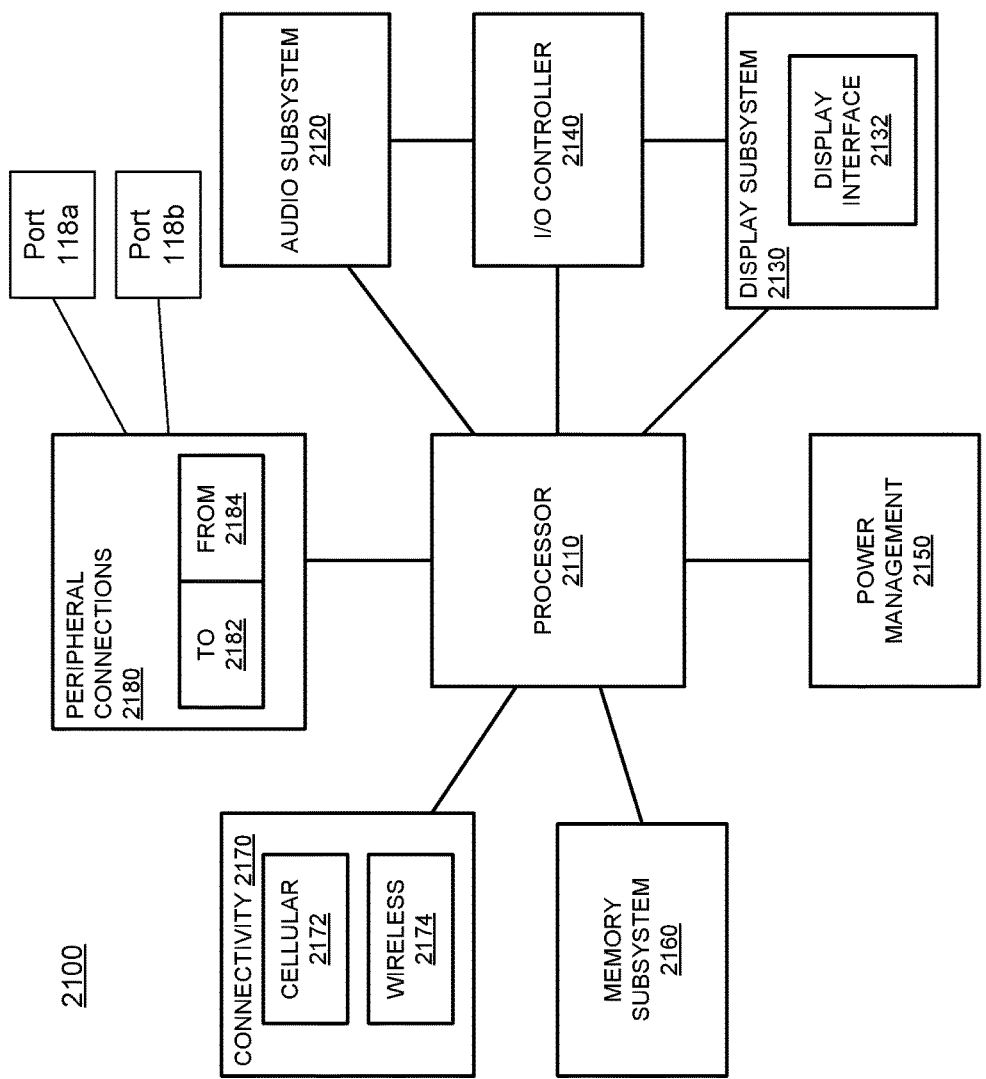
FIG. 8 illustrates a computer system or a SoC (System-on-Chip), where a voltage profile and/or a current profile of an I/O port may be dynamically changed, in accordance with some embodiments.

FIG. 8 illustrates a computer system or a SoC (System-on-Chip) 2100, where a voltage profile and/or a current profile of an I/O port (e.g., ports 118a and/or 118b) may be dynamically changed, in accordance with some embodiments. It is pointed out that those elements of FIG. 8 having the same reference numbers (or names) as the elements of any other figure can operate or function in any manner similar to that described, but are not limited to such.

In some embodiments, computing device 2100 represents an appropriate computing device, such as a computing tablet, a mobile phone or smart-phone, a laptop, a desktop, an IOT device, a server, a set-top box, a wireless-enabled e-reader, or the like. It will be understood that certain components are shown generally, and not all components of such a device are shown in computing device 2100.

In some embodiments, computing device 2100 includes a first processor 2110. The various embodiments of the present disclosure may also comprise a network interface within 2170 such as a wireless interface so that a system embodiment may be incorporated into a wireless device, for example, cell phone or personal digital assistant.

In one embodiment, processor 2110 can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O (input/output) with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100. In one embodiment, computing device 2100 includes a clock generation subsystem 2152 to generate a clock signal.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 2180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, the peripheral connections 2180 may comprise or may be attached to one or more I/O ports, e.g., ports 118*a* and 118*b*. In some embodiments, the computing device 2100 may comprise arrangement to control a current profile and/or a voltage profile of the ports 118*a* and/or 118*b*, e.g., as discussed with respect to FIGS. 1-7.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following example clauses pertain to further embodiments. Specifics in the example clauses may be used anywhere in one or more embodiments. All optional features of the apparatus described herein may also be implemented with respect to a method or process.

Clause 1. An apparatus comprising: a first input/output (I/O) port; a second I/O port; circuitry to generate (i) a first signal at a first voltage level and (ii) a second signal at a second voltage level; and switching circuitry to selectively supply any one of the first signal or the second signal to any one of the first I/O port or the second I/O port.

Clause 2. The apparatus of clause 1, further comprising: a controller to control the switching circuitry such that the first I/O port is to: receive the first signal at a first time-period, receive the second signal at a second time-period, and not receive either of the first signal or the second signal at a third time-period.

Clause 3. The apparatus of any of clauses 1-2, further comprising: a battery; and a controller to receive charge information associated with the battery, wherein the controller is to control the switching circuitry based at least in part on the charge information associated with the battery.

Clause 4. The apparatus of any of clauses 1-2, further comprising: a controller to control the switching circuitry such that the first I/O port is to: receive the first signal in response to a first external device being attached to the first I/O port, receive the second signal in response to a second external device being attached to the first I/O port, and not receive either of the first signal or the second signal in response to no external devices being attached to the first I/O port.

Clause 5. The apparatus of any of clauses 1-2, further comprising: a battery; and a controller to configure the switching circuitry such that the first I/O port is to: receive the first signal with the first voltage level in response to a charge level of the battery being higher than a first threshold value, receive the second signal with the second voltage level in response to a charge level of the battery being between a first threshold value and a second threshold value, and not receive either of the first signal or the second signal in response to the charge level of the battery being lower than the second threshold value.

Clause 6. The apparatus of clause 5, wherein the switching circuitry comprises a plurality of switches.

Clause 7. The apparatus of any of clauses 1-6, wherein the I/O port is a Universal Serial Bus (USB) type-C port.

Clause 8. An apparatus comprising: a first circuitry to generate a first signal at a first voltage level and a second signal at a second voltage level; and a second circuitry to selectively supply any one of the first signal or the second signal to any one of a first input/output (I/O) port or a second I/O port.

Clause 9. The apparatus of clause 8, further comprising: a third circuitry to supply the first signal to the first I/O port at a first time-period; a fourth circuitry to supply the second signal to the first I/O port at a second time-period; and a fifth circuitry to refrain from supplying either of the first signal or the second signal to the first I/O port at a third time-period.

Clause 10. The apparatus of clause 10, further comprising: a sixth circuitry to selectively supply any one of the first signal or the second signal to any one of the first I/O port or the second I/O port based at least in part on one or more of: configuration of a first external device attached to the first I/O port, configuration of a second external device attached to the second I/O port, or a charge level of a battery hat is to supply power to the first I/O port and the second I/O port.

Clause 11. A system comprising: a battery to selectively supply power to the system; an input/output (I/O) port, wherein an external device is to be selectively attached to the output port; circuitry to supply a signal to the I/O port; and a controller to: receive information associated with the battery, and dynamically limit a current of the signal supplied to the I/O port, based at least in part on the information associated with the battery.

Clause 12. The system of clause 11, wherein the information associated with the battery comprises one or both of a remaining charge of the battery, or an estimated time remaining before the charge of the battery is exhausted.

Clause 13. The system of any of clauses 11-12, wherein the controller is to: set a first maximum value of the current of the signal supplied to the I/O port in response to a first percentage of charge remaining in the battery; and set a second maximum value of the current of the signal supplied to the I/O port in response to a second percentage of charge remaining in the battery, wherein the first percentage of charge is higher than the second percentage of charge, and wherein the first maximum value of the current is higher than the second maximum value of the current.

Clause 14. The system of any of clauses 11-13, further comprising: a monitor circuitry to estimate the current of the signal supplied to the IO port, wherein the controller is to dynamically limit the current of the signal supplied to the IO port, based at least in part on the estimate of the current of the signal supplied to the IO port.

Clause 15. The system of any of clauses 11-14, wherein: the circuitry is to receive, via the I/O port, configuration information of the external device; and the controller is to dynamically limit the current of the signal supplied to the IO port, based at least in part on the configuration information of the external device.

Clause 16. The system of any of clauses 11-15, further comprising: a switch between an output of the circuitry and the I/O port, wherein the controller is to control an on state and an off state of the switch, based at least in part on the information associated with the battery.

Clause 17. The system of any of clauses 11-16, wherein the output port is a Universal Serial Bus (USB) type-C port.

Clause 18. An apparatus comprising: a first circuitry to supply a signal to an input/output (I/O) port of the device; a second circuitry to collect information associated with a battery that is to power the device; and a third circuitry to dynamically limit a current of the signal supplied to the I/O port, based at least in part on the information associated with the battery.

Clause 19. The apparatus of clause 18, further comprising: a fourth circuitry to dynamically limit the current of the signal, based at least in part on a charge level of the battery being less than a threshold.

Clause 20. The apparatus of any of clauses 18-19, further comprising: a fourth circuitry to dynamically control the switch, based at least in part on the information associated with the battery.

Clause 21. A method comprising: generating (i) a first signal at a first voltage level and (ii) a second signal at a second voltage level; and selectively supplying any one of the first signal or the second signal to any one of a first input/output (I/O) port or a second I/O port.

Clause 22. The method of clause 21, wherein the selectively supplying further comprises: supplying the first signal to the first I/O port at a first time-period; supplying the second signal to the first I/O port at a second time-period; and refraining from supplying either of the first signal or the second signal to the first I/O port at a third time-period.

Clause 23. The method of any of clauses 21-22, further comprising: receiving charge information associated with a battery, wherein any one of the first signal or the second signal is selectively supplied to any one of the first I/O port or the second I/O port, based at least in part on the charge information associated with the battery.

Clause 24. A non-transitory computer-readable storage medium having instructions that when executed by a processor, cause the processor to perform the method of any one of clauses 21-23.

Clause 25. An apparatus comprising: means for performing the method in any of the clauses 21-23.

Clause 26. A non-transitory computer-readable storage medium having instructions that when executed by a processor, cause the processor to: generate (i) a first signal at a first voltage level and (ii) a second signal at a second voltage level; and selectively supply any one of the first signal or the second signal to any one of a first input/output (I/O) port or a second I/O port.

Clause 27. The non-transitory computer-readable storage medium of clause 26, wherein the instructions cause the processor to selectively supply by: supplying the first signal to the first I/O port at a first time-period; supplying the second signal to the first I/O port at a second time-period; and refraining from supplying either of the first signal or the second signal to the first I/O port at a third time-period.

Clause 28. The non-transitory computer-readable storage medium of any of clauses 26-27, wherein the instructions cause the processor to: receive charge information associated with a battery, wherein any one of the first signal or the second signal is selectively supplied to any one of the first I/O port or the second I/O port, based at least in part on the charge information associated with the battery.

Clause 29. An apparatus comprising: means for generating (i) a first signal at a first voltage level and (ii) a second signal at a second voltage level; and means for selectively supplying any one of the first signal or the second signal to any one of a first input/output (I/O) port or a second I/O port.

Clause 30. The apparatus of clause 29, wherein the means for selectively supplying further comprises: means for supplying the first signal to the first I/O port at a first time-period; means for supplying the second signal to the first I/O port at a second time-period; and means for refraining from supplying either of the first signal or the second signal to the first I/O port at a third time-period.

Clause 31. The apparatus of any of clauses 29-30, further comprising: means for receiving charge information associated with a battery, wherein any one of the first signal or the second signal is selectively supplied to any one of the first I/O port or the second I/O port, based at least in part on the charge information associated with the battery.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:
1. An apparatus comprising:
a first input/output (I/O) port;
a second I/O port;
circuitry to generate a first power supply signal at a first voltage level and a second power supply signal at a second voltage level; and
switch circuitry to selectively supply any one of the first power supply signal or the second power supply signal to any one of the first I/O port or the second I/O port.

2. The apparatus of claim 1, further comprising:
a controller to control the switch circuitry such that the first I/O port is to:
receive the first power supply signal at a first time-period,
receive the second power supply signal at a second time-period, and
not receive either of the first power supply signal or the second power supply signal at a third time-period.

3. The apparatus of claim 1, further comprising:
a battery; and
a controller to receive charge information associated with the battery,
wherein the controller is to control the switch circuitry based at least in part on the charge information associated with the battery.

4. The apparatus of claim 1, further comprising:
a controller to control the switch circuitry such that the first I/O port is to:
receive the first power supply signal in response to a first external device being attached to the first I/O port,
receive the second power supply signal in response to a second external device being attached to the first I/O port, and
not receive either of the first power supply signal or the second power supply signal in response to no external devices being attached to the first I/O port.

5. The apparatus of claim 1, further comprising:
a battery; and
a controller to configure the switch circuitry such that the first I/O port is to:
receive the first power supply signal with the first voltage level in response to a charge level of the battery being higher than a first threshold value,
receive the second power supply signal with the second voltage level in response to a charge level of the battery being between a first threshold value and a second threshold value, and
not receive either of the first power supply signal or the second power supply signal in response to the charge level of the battery being lower than the second threshold value.

6. The apparatus of claim 5, wherein the switch circuitry comprises a plurality of switches.

7. The apparatus of claim 1, wherein the I/O port comprises a Universal Serial Bus (USB) type-C port.

8. An apparatus comprising:
a first circuitry to generate a first power supply signal at a first voltage level, and a second power supply signal at a second voltage level; and
a second circuitry to selectively supply any one of the first power supply signal or the second power supply signal to any one of a first input/output (I/O) port or a second I/O port.

9. The apparatus of claim 8, further comprising:
a third circuitry to supply the first power supply signal to the first I/O port at a first time-period;
a fourth circuitry to supply the second power supply signal to the first I/O port at a second time-period; and a fifth circuitry to refrain from supplying either of the first power supply signal or the second power supply signal to the first I/O port at a third time-period.

10. The apparatus of claim 9, further comprising:
a sixth circuitry to selectively supply any one of the first power supply signal or the second power supply signal to any one of the first I/O port or the second I/O port based at least in part on one or more of:
configuration of a first external device attached to the first I/O port,
configuration of a second external device attached to the second I/O port, or
a charge level of a battery that is to supply power to the first I/O port and the second I/O port.

11. A system comprising:
a battery to selectively supply power to the system;
a first input/output (I/O) port, wherein an external device is to be selectively attached to the first I/O port;
a second I/O port;
circuitry to supply a first power supply signal, and a second power supply signal;
a switch to selectively supply one of the first or second power supply signals to one of the first or second I/O ports; and
a controller to:
receive information associated with the battery, and
dynamically limit a current associated with the first or second power supply signals supplied to the first or second I/O ports, based at least in part on the information associated with the battery.

12. The system of claim 11, wherein the information associated with the battery comprises one or both of a remaining charge of the battery, or an estimated time remaining before the charge of the battery is exhausted.

13. The system of claim 11, wherein the controller is to:
set a first maximum value of the current of the first or second power supply signals supplied to the first or second I/O port in response to a first percentage of charge remaining in the battery; and
set a second maximum value of the current of the first or second power supply signals supplied to the first or second I/O port in response to a second percentage of charge remaining in the battery,
wherein the first percentage of charge is higher than the second percentage of charge, and
wherein the first maximum value of the current is higher than the second maximum value of the current.

14. The system of claim 11, further comprising:
a monitor circuitry to estimate the current associated with the first or second power supply signals supplied to the first or second IO port,
wherein the controller is to dynamically limit the current associated with the first or second power supply signals supplied to the first or second IO port, based at least in part on the estimate associated with the current of the first or second power supply signals supplied to the first or second IO port.

15. The system of claim 11, wherein:
the circuitry is to receive, via the first or second I/O port, configuration information of the external device; and
the controller is to dynamically limit the current of the first or second power supply signals supplied to the first or second IO port, based at least in part on the configuration information of the external device.

16. The system of claim 11, further comprising:
wherein the controller is to control an on state and an off state of the switch, based at least in part on the information associated with the battery.

17. The system of claim 11, wherein the output port comprises a Universal Serial Bus (USB) type-C port.

18. The apparatus of claim 1, wherein the circuitry comprises a voltage regulator.

19. The apparatus of claim 1, wherein the circuitry comprises a current limiter.

20. The apparatus of claim 1, wherein the circuitry comprises a register to store a value to control a maximum current.

* * * * *